March 24, 1959    J. J. DRYSDALE    2,879,309
DIFLUOROMETHYLENECYCLOALKANES AND THEIR PREPARATION
Filed June 25, 1956
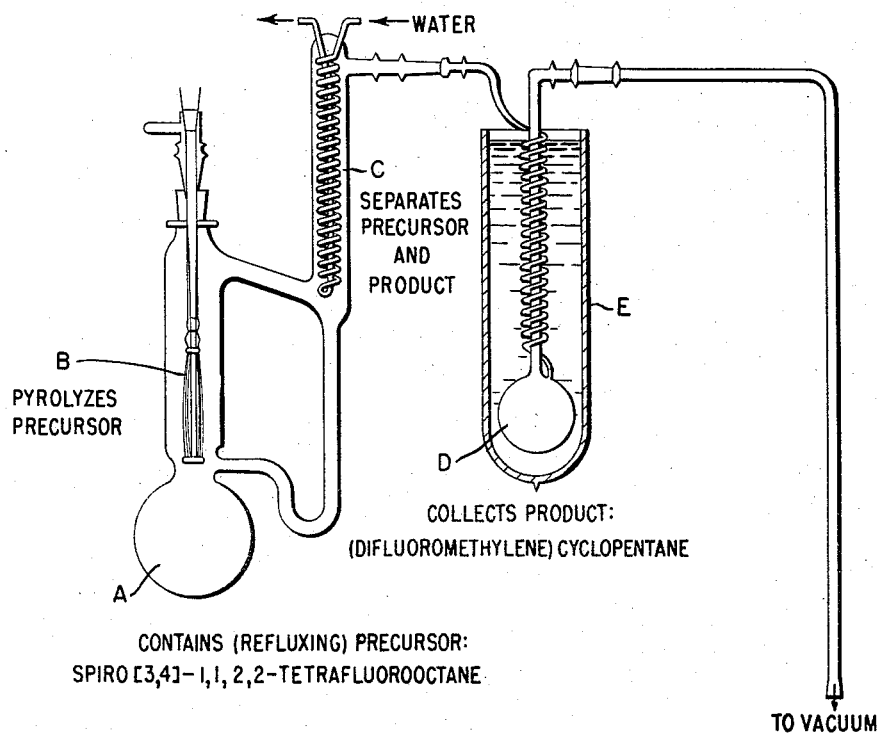
INVENTOR
JOHN J. DRYSDALE
BY
ATTORNEY

United States Patent Office 2,879,309
Patented Mar. 24, 1959

2,879,309

DIFLUOROMETHYLENECYCLOALKANES AND THEIR PREPARATION

John J. Drysdale, Clifton Park Manor, Del., assignor to E. I. du Pont de Nemours and Company, Wilmington, Del., a corporation of Delaware Application June 25, 1956, Serial No. 593,655

5 Claims. (Cl. 260—648)

This invention relates to fluorine-containing cyclic organic compounds and to a method for their preparation.

Fluorine-containing organic compounds have a wide variety of applications. Polymerizable fluorine-containing monomers are of special interest.

This invention has as an object the preparation of new fluorine-containing polymerizable monomers. Other objects will appear hereinafter.

These objects are accomplished by the present invention of difluoromethylenecycloalkanes having 5–7 annular carbon atoms in the cycloalkane group. A preferred group of the products of this invention are the difluoromethylenecycloalkanes which are hydrocarbon except for the two fluorines, which have 5–7 annular carbons, have at most 6 extra-annular carbons, and have only the one unsaturation.

The products of this invention are prepared by pyrolyzing a saturated tetrafluorospirohydrocarbon having the four fluorine substituents on two adjacent carbons of a cyclobutane ring and the only substituents thereon, having a carbon of this cyclobutane ring as a spiro carbon in common with a cycloalkane ring of 5–7 carbons, and having a total of 8–10 annular carbons and at most 6 extra-annular carbons. This pyrolysis is carried out by heating the vapors of the spiro compound at 650° to 950° C. under reduced pressure and immediately isolating the difluoromethylenecycloalkane having from 5–7 annular carbons and removing it from the reaction zone.

The difluoromethylenecycloalkanes of this invention are unstable at the temperature at which the tetrafluorospirohydrocarbons are pyrolyzed, consequently they must be removed from the reaction zone as they are formed. It is also desirable from an economical standpoint that a high conversion of the tetrafluorospirohydrocarbon to the difluoromethylenecycloalkane be obtained. Pyrolysis of the spiro compound in a conventional hot tube at very short contact time will give low conversions of the spiro hydrocarbon to the desired difluoromethylenecycloalkane. However, a large number of such pyrolyses and distillations of the reaction products must be made to prepare any appreciable quantity of product. Consequently, it is preferable to carry out the pyrolysis by a method that continuously removes the reaction product from the reaction zone immediately after it is formed, and which returns the unpyrolyzed starting spiro hydrocarbon to the reaction zone.

The pyrolysis is conveniently carried out by passing the vapors of the tetrafluorospirohydrocarbon at reduced pressure, i. e., at pressures below 760 mm. Hg, over the surface of an inert metal heated to a red glow, preferably a platinum wire heated to red heat, in a system of reaction zone, condensers, and traps arranged so that unreacted starting material can be condensed and returned to the reaction vessel while the more volatile difluoromethylenecycloalkane passes through the condenser and is isolated in a cold trap. With spiro [3.4]-1,1,2,2-tetrafluorooctane a pressure of about 50 mm. Hg is satisfactory for operation with a water-cooled reflux condenser, followed by a cold trap cooled by liquid nitrogen. The reaction products collected in the cold trap are then fractionally distilled to isolate the difluoromethylenecycloalkane. The pyrolysis is conveniently carried out in apparatus of the type commonly used as ketene generators. A suitable type of ketene generator is one similar to that described by Choh Hao Li in Science 90, 143 (1939), with the exception that a platinum filament is used instead of a tungsten filament. This apparatus can be constructed of materials inert to the reactants and reaction products under the reaction conditions, e. g., glass, stainless steel, etc.

In the pyrolysis process of this invention, there can be employed any tetrafluorospirohydrocarbon having the four fluorine atoms on two adjacent carbons of a cyclobutane ring and the only substituent thereon, having a carbon of the cycloalkane ring as a spiro carbon in common with the cycloalkane ring of 5–7 carbons, and having a total of 8–10 annular carbons and at most 6 extra-annular carbons. These compounds are prepared by heating tetrafluoroethylene and a methylenecycloalkane having 5–7 annular carbon atoms at a temperature of from 50° to 300° C. under pressure in a closed reaction vessel in the absence of a polymerization initiator. More particularly, these compounds are conveniently prepared by heating a mixture of substantially equivalent amounts of tetrafluoroethylene and a methylenecycloalkane having 5–7 annular carbon atoms and a small amount of a polymerization inhibitor, e.g., 0.001–1% of hydroquinone, and a small amount of a stabilizer, e.g., 0.001–0.01% of the commercial terpene hydrocarbon mixture known as Terpene B (which is a by-product from the preparation of camphor and is a mixture of hydrocarbons consisting predominantly of dipentene, terpinene and terpinolene), in a closed reaction vessel under autogenous pressure at 100–200° C. for several hours, e.g., 8–24 hours. At the end of the reaction period the fluorine-containing spiro compound is isolated from the reaction mixture by conventional means, e.g., by fractional distillation. Methylene cycloalkanes having 5–7 annular carbons and any annular alkyl substituents having no more than a total of 6 carbons are preferred for use in the process of this invention since they are more readily available. Wholly hydrocarbon methylenecycloalkanes having the methylene unsaturation as their only unsaturation, and having 5–7 annular carbons and 1–6 extra-annular carbons are particularly preferred. The reaction of the tetrafluoroethylene with the methylenecycloalkane can be carried out in equipment constructed of various inert metals, such as, for example, iron, stainless steel, aluminum, copper, etc.

The tetrafluoroethylene reactant used in the preparation of the spiro compound can be of the grade commerically available. The methylenecycloalkanes used in the process of this invention can be made by known methods, for example, by the method described in British Patent 666,106, and by the method described by Bailey, Hewitt and King in J. Am. Chem. Soc. 77, 357 (1955). This latter method, involving the pyrolysis of cycloalkane-methyl acetates, e.g., the pyrolysis of hexahydrobenzyl acetate to methylenecyclohexane, is an especially good way of preparing the methylenecycloalkanes for use in preparing the spiro intermediates.

The following example in which parts are by weight is illustrative of the invention:

EXAMPLE I

Preparation of difluoromethylenecyclopentane

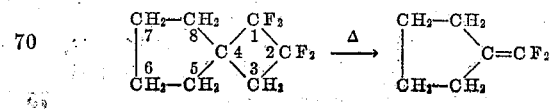

A reaction vessel of the type described by Choh Hao Li and modified by the use of a platinum filament B instead of tungsten (as mentioned previously) is used for the pyrolysis of spiro[3.4] - 1,1,2,2 - tetrafluorooctane. This is shown in the drawing herewith. The platinum wire at the top of the reaction vessel is heated to a red heat by means of an electric current. The reaction pot A is charged with 45 parts of spiro[3.4]-1,1,2,2-tetrafluorooctane, prepared as described in Examples A and B, below, and heated to reflux under a pressure of 50–52 mm. mercury. The refluxing vapors surround the glowing wire and the low boiling cleavage products pass through the water-cooled condenser C into the U-trap D which is cooled by liquid nitrogen held within container E. Most of the starting material condenses in the reflux condenser C and returns to the reaction vessel A; however, some of the starting material is carried over into the cold trap D. Heating is continued until the reaction vessel is almost dry. The reaction product collected in the cold trap D is then fractionally distilled. There is isolated approximately 3–4 parts of difluoromethylenecyclopentane boiling at 79–81° C. and having a refractive index, $n_D^{29}$, of 1.3955–1.3905. This corresponds to a yield of 35–40% of theory. Approximately one part of this product boils at 81° C. and $n_D^{29}=1.3905$. Approximately 30 parts of starting material is recovered. The structure of the difluoromethylenecyclopentane is confirmed by nuclear magnetic resonance analysis.

When the spiro[3.4]-1,1,2,2-tetrafluorooctane of the above example is replaced with spiro[3.5]-1,1,2,2-tetrafluorononane, spiro[3.6]-1,1,2,2-tetrafluorodecane, spiro[3.4]-1,1,2,2-tetrafluoro-6-methyloctane, spiro[3.5]-1,1,2, 2-tetrafluoro-6-methylnonane, and spiro[3.5]-1,1,2,2-tetrafluoro-7-methylnonane, and the process of said example is repeated, there are obtained difluoromethylenecyclohexane, difluoromethylenecycloheptane, 1-(difluoromethylene)-3-methylcyclopentane, 1-(difluoromethylene)-3-methylcyclohexane, and 1-(difluoromethylene)-4-methylcyclohexane, respectively.

The necessity for carrying out the pyrolysis step of this invention under such conditions that there is a very rapid passage of the spirotetrafluoroalkane past the pyrolysis surface, e.g., the glowing red platinum wire, is shown by an experiment in which no difluoromethylenecyclopentane was isolated when spiro[3.4]-1,1,2,2-tetrafluorooctane was passed at a pressure of 5–15 mm. mercury through a cylindrical reaction tube 12″ long, packed with quartz tubing and heated at 850° C. by a 12″ cylindrical electric furnace. When difluoromethylenecyclopentane is maintained at high temperatures, e.g., about 850° C., for more than a very short time, it is decomposed to various low boiling products, including ethylene, vinylidene fluoride, and tetrafluoroethylene.

The examples below illustrate the preparation of the spiro intermediates.

EXAMPLE A

*Preparation of spiro[3.4]-1,1,2,2-tetrafluorooctane*

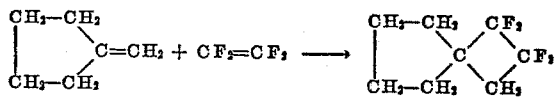

A mixture of 35.0 parts of tetrafluoroethylene, 24.6 parts of methylenecyclopentane, 0.25 part of hydroquinone and a trace of the mixture of hydrocarbons known as Terpene B is heated at 150° C. for eight hours under autogenous pressure. The reaction product is distilled at atmospheric pressure and the fraction boiling at 123–128° C. is collected. This fraction amounts to 15.8 parts and is spiro[3.4]-1,1,2,2-tetrafluorooctane.

*Analysis.*—Calculated for $C_8H_{10}F_4$: C, 52.8%; H, 5.5%; F, 41.7%; M.W., 182. Found: C, 51.89%; H, 5.73%; F, 41.0%, 41.4%; M.W., 175, 182.

EXAMPLE B

*Preparation of spiro[3.4]-1,1,2,2-tetrafluorooctane*

The process of Example A is repeated with the exception that 0.05 part of hydroquinone is used and the reaction mixture is heated at 175° C. for 16 hours at autogenous pressure. The crude product obtained amounts to 36.0 parts which, on distillation, gives 18.9 parts of product boiling at 127–134° C. A portion of the product from both Examples A and B are combined (30.02 parts) and is refractionated. A total of 25.9 parts of pure spiro[3.4]-1,1,2,2-tetrafluorooctane, boiling at 137–139.5° C., is obtained. This material has a refractive index, $n_D^{25}$, of 1.3842–1.3839.

When the methylenecyclopentane of Examples A and B is replaced with equivalent amounts of methylenecyclohexane, methylenecycloheptane, 1-methylene-3-methylcyclopentane, 1-methylene-3-methylcyclohexane, and 1-methylene-4-methylcyclohexane and the procedure of those examples repeated, the following spiro compounds are obtained: spiro[3.5]-1,1,2,2-tetrafluorononane, spiro[3.6]-1,1,2,2-tetrafluorodecane, spiro[3.4]-1,1,2,2-tetrafluoro-6-methyloctane, spiro[3.5]-1,1,2,2-tetrafluoro-6-methylnonane, and spiro[3.5]-1,1,2,2-tetrafluoro-7-methylnonane, respectively.

The difluoromethylenecycloalkanes of this invention are useful for various purposes. In particular, they are useful for polymerization in the presence of free radical generating polymerization initiators. More particularly, they are especially useful for copolymerization with vinyl monomers. This property of the difluoromethylenecycloalkanes is illustrated below.

Difluoromethylenecyclopentane is copolymerized with an equal amount of vinyl fluoride in the presence of an equal amount of distilled water and with 0.3% (based on weight of monomers) of di-t-butyl peroxide and 0.3% of disodium hydrogen phosphate heptahydrate at about 135° C. under 1000 atmospheres' water pressure. The resulting copolymer of vinyl fluoride and difluoromethylenecyclopentane can be pressed into self-supporting films. This copolymer is useful as a self-supporting film and in coating compositions and molding compositions.

The difluoromethylenecycloalkanes of this invention are also useful as chemical intermediates. Thus, they can be hydrogenated under pressure in the presence of a hydrogenation catalyst to difluoromethylcycloalkanes which are useful as solvents and reaction media because of their stability.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows.

I claim:

1. A (difluoromethylene)cycloalkane, hydrocarbon except for two fluorines, having 5–7 annular carbons.

2. A (difluoromethylene)cycloalkane, hydrocarbon except for the two fluorines, having 5–7 annular carbons, at most 6 extra-annular carbons, and only the single difluoromethylene unsaturation.

3. (Difluoromethylene)cyclopentane.

4. The process of preparing a (difluoromethylene)cycloalkane which is hydrocarbon except for the two fluorines and which has (1) 5–7 annular carbons, (2) at most six extra-annular carbons and (3) only the single difluoromethylene unsaturation comprising pyrolyzing vapor of a saturated tetrafluorospirohydrocarbon under reduced pressure at about 650–950° C. and immediately removing the product from the pyrolysis zone, said tetrafluorospirohydrocarbon being wholly hydrocarbon except for four fluorine atoms which are paired on adjacent carbons of a cyclobutane ring and are the only substituents thereon, and having (1) a carbon of said cyclobutane ring as a spiro carbon in common with a cycloalkane ring of 5–7 carbons, (2) a total of 8–10 annular carbons and (3) at most six extra-annular carbons.

5. The process for preparing (difluoromethylene)-cyclopentane which comprises passing vapor of spiro[3.4]-1,1,2,2-tetrafluorooctane over a platinum wire maintained at red heat at reduced pressure and isolating the (difluoromethylene)cyclopentane.

No references cited.